Feb. 14, 1933.                T. HUSAIN ET AL                    1,897,667
                  METHOD OF PRODUCING A CELLULAR CLAY BODY
                           Filed May 17, 1930
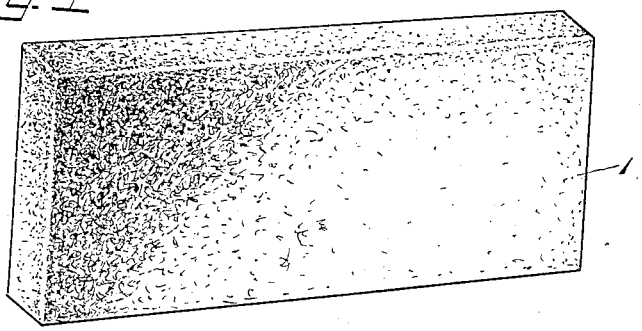
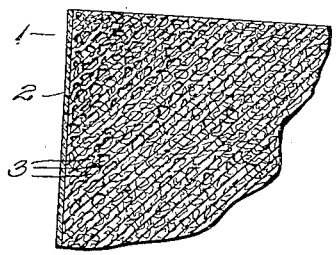   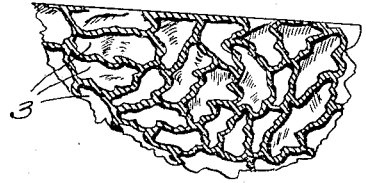
Inventor
T. Husain &
G. A. Bole
By W. D. McDowell
Attorney Patented Feb. 14, 1933

1,897,667

UNITED STATES PATENT OFFICE

TAJAMUL HUSAIN, OF ROSEVILLE, AND GEORGE A. BOLE, OF COLUMBUS, OHIO, ASSIGNORS, BY MESNE ASSIGNMENTS, TO CELLULAR CLAY CORPORATION, OF PITTSBURGH, PENNSYLVANIA, A CORPORATION OF DELAWARE

METHOD OF PRODUCING A CELLULAR CLAY BODY

Application filed May 17, 1930. Serial No. 453,395.

This invention relates broadly to building units or blocks, and has particular reference to a novel and improved unit composed of fired clay materials and characterized by its high state of cellularity, whereby the said building unit or block possesses unusual lightness of weight, resistance to the transmission of heat and destruction by fire and other very important properties which render the block or unit particularly suitable in the construction of buildings and walls and in other capacities.

As economic demands have brought on increasingly tall building structures which require steel columns and building members of increased weight and size directly proportionate to the height of the buildings, it is very desirable that certain fire preventing materials, such as floors, partitions and enclosing walls, be made of as light weight material as can be utilized and still meet the strength requirements of such construction. Increased concentration of population with resulting congestion constitute an ever increasing fire hazard and fires must be confined to their points of origin insofar as possible. Also, steel or other structural supporting members of buildings must be protected in order to minimize the fire hazard, since such members lose their load sustaining properties when exposed to high temperatures. To meet these ends, many so-called "fire proofing" or "fire resisting" materials are in common use. If protection from the effects of fire can be obtained by using a material of light weight, it is evident that considerable advantage will accrue from its use. Further advantage would result from the use of a light weight material of a fire resisting character capable of being placed in service and bonded or secured by mechanical means, in order to thus eliminate mortar or plaster which when once used renders the individual units substantially unfit for further use in the event of demolition of the building.

It is an outstanding object of the invention to provide a fired clay body wherein its fire resisting properties together with lightness in weight are secured by the high porosity or cellularity of said body, which when observed in cross-section consists of a plurality of small openings or cells of substantially uniform size, the said openings being out of communication with each other and individually sealed by the relatively thin clay walls which form and separate the openings or cells. The latter are formed in the clay body at the time of its manufacture by releasing or developing in a fluid clay mass certain gases produced through chemical interaction or otherwise in the fluid body forming materials, which gas operates upon expansion to produce a multiplicity of the uniform sized openings by pressure on the plastic clay walls, whereby when the material sets prior to its subsequent hardening, through fire treatment, the cell walls assume a fixed size and as a result sealed air spaces are provided in the individual openings or cells which function, when the material is in use, to highly resist heat transmission by substantially eliminating the transmission of heat through the body by convection and also greatly minimize the transmission of heat, as compared with denser clay products, by conduction and radiation.

If a light weight material will give service in restraining a fire without spalling and cracking, which occurs with heavier and denser materials, and can be continued in service after such emergencies, its advantages would be considerable. Also, if a light weight material, by virtue of its texture and constitution will retard heat flow at room temperature as well as under fire conditions it would correspondingly improve house heating conditions. Wet walls form an undesirable condition in the case of much masonry construction. The moisture enters the back-up material largely through the mortar joints in the facing material and must be absorbed by the back-up material since otherwise the moisture will go through to the interior. The porous material comprising the present invention has been found to meet these requirements to a very high degree and further possesses desirable acoustic properties when used in the construction of interior finished walls.

A further object of the invention rests in a light weight cellular or porous material formed from a fired clay body which may be decorated with an impervious coating or glaze, applied either before or after the product is placed in position, whereby the ornamental appearance of the material when in wall or other formation is susceptible to variation and artistic control, and said coating or glaze may further serve in the capacity of increasing the resistance of the material to either heat or cold transmission.

A still further object of the invention resides in the provision of a porous clay material which can be cut, sawed, dressed or tooled to any desired size or shape either at the manufacturing plant or on the construction job before or after being placed, and which constitutes a new capability in a fired clay product.

The material comprising the present invention is essentially a fired clay product of high cellularity. Inert fillers, however, such as diatomaceous earth, infusorial earth, etc., can be added in such percentages as can be carried by the clay without decreasing too greatly its viscosity when in the fluid state or its strength when in the dry or burned state. It is by virtue of this high cellularity that the material possesses such a lightness of weight. The degree of cellularity can be controlled in the manufacture of the material, to from that common to ordinary heavy clay wares to as high as 90%, and preferably the material comprising the preferred embodiment of the invention has a cellularity of 50% or more. The weight of the material will vary, of course, directly with the cellularity, for example, from 20 pounds per cubic foot to as high as that of ordinary heavy clay products which is from 100 to 125 pounds per cubic foot. These figures indicate a great difference in weight between the product comprising the present invention and, for example, ordinary building tile which the present invention to such a large extent is intended to improve in many respects.

The strength of the light weight material can be controlled by the size of the cells, the percentage of cellularity and the degree of burning. Tests disclose that the porous products comprising the present invention possess compressive strength of from 400 pounds per square inch for the highly porous material (80 to 90%) to 2000 pounds per square inch for the less porous material (50 to 60%). The kind of clay used also affects the strength of the material. The light weight clay material which we have perfected has, as previously stated, a high fire resistance. The fire resistance of building materials may be measured by the following conditions:

a. The ease with which it supports combustion.

b. The deterioration of the material itself such as the burning out of certain constituents or the driving off of chemically combined water which is essential to the permanency of certain constructions.

c. The weakening of the construction due to the calcination and fusion of the mortar or other materials used in bonding the units together.

d. The shrinkage of units, as is common to certain constructions and materials.

e. The damage such as cracking, spalling, or flaking caused by fire or high temperature exposure.

f. The rate at which heat is transferred through the material, causing high temperatures on the unexposed side of the material which would weaken the steel numbers of construction or cause the ignition of other materials and the spread of fire.

The light weight material which we have perfected, and which is claimed herein, is made permanent by the action of temperatures higher than those incurred in fires, and all combustible matter and combined water is driven off so that when put in service it will not burn or deteriorate when exposed to fire. By virtue of the physical characteristics of the light weight material itself it can be built in constructions without the use of mortar, as hereinafter shown, and hence cannot be weakened by the failure of mortar as is common with all other known, non-combustible building materials. Our light weight material is shrunk by the firing used in its manufacture and hence cannot shrink further during normal fire exposure. Tests have shown that the tendency to expand during heat exposure, as is common in most clay products, is reduced to the minimum by the cellular nature of the material so that there is no tendency to crack, spall or have its transverse webs (if made in hollow tile form) fracture as is the case with the more common types of building units. This light weight material has been shown by tests to have good insulating ability at high temperatures so that the temperature rise, caused by standard fire exposure, on the unexposed side of constructions of this material, is much less than that obtained through denser materials (clay, concrete, etc.) of several times the weight of this material, and that the temperature rise is not nearly as high as would be obtained on the unexposed side of the more common hollow units of the same thickness. This lower rate of heat transfer makes it possible to use not only lighter materials for building members, but also thinner sections than commonly used by other material to obtain sufficient fire protection.

The light weight material which we have perfected not only has good resistance to heat transfer under the conditions imposed by fire exposure, but also is a good insulator under continuous exposure to high temperatures. Tests of this material when made up in the shape comparable with that of other materials now on the market show that the heat insulating value is high. If a clay of high refractoriness is used, such as diaspore, then the material becomes a truly high temperature insulator and can be used at temperatures generally in advance of other materials now in use. If a truly high temperature (above 2500° F.) insulator is desired the gypsum addition is either kept at a low figure or it is entirely eliminated.

Due to the porous structure of the material the insulating values at climatic temperatures are also comparable with cork, composition board, and other well known materials. It should be understood, however, that the insulating value of our material is dependent upon the number, size and shape of the cells or pores, all of which can be controlled in the process of manufacture.

The insulating value of most materials at room temperature is often lowered after being put in service by the saturation of the cellular spaces with moisture, which is gradually drawn into the cells by the expansion and contraction of the air caused by the continuous cycles of the temperature changes from hot to cold. This process is generally referred to by the expression "breathing". Our present materials may be glazed and the cell spaces may be thus sealed from the exterior, so that the expanding air cannot leave the material and return again with a change of moisture, thus producing what we term a "non-breathing" insulator.

The light weight units which we have perfected can be tied together in construction by mechanical means such as nails so that in the case of demolition of a building the units can be disassembled and reused in other constructions without cleaning away the mortar or other bonding materials which would damage or impair the value of ordinary masonry units. As these units do not require the use of mortar or other cementing materials they can be assembled in construction without necessarily resorting to the use of skilled labor, thus making the use of said materials more flexible than ordinary masonry materials. Our material may be glazed, painted or decorated either before or after its assembly, thus making its use as a finished wall, without the use of plaster, practical, economical and decorative.

The controlled cell area in our product is obtained by the liberation of a gas preferably through chemical reaction during the forming of the clay ware while the latter is in a fluid state. One preferred method of making the ware consists of mixing with the clay-containing carbonates (either in its natural form or by the separate addition of the carbonate) a weakly acid solution in such a manner that a gas will be evolved without the employment of extraneous heat. The clay-water mix or slip is of such consistency that it resembles a thick cream. This consistency is desirable in order that a large amount of the gas will be entrapped during the chemical action and yet confined in the clay body without being released from its outer surface. We refer to this process as "bloating the clay".

In order that the formed clay mass can be removed quickly from the forming table where the chemical action takes place, plaster of Paris, from a few percent up to 15%, has been added to the mix. If an especially quick setting action is desired, the percentage may be carried considerably beyond 15%. The fact is, any combination of clay and plaster will serve, depending upon the time of set desired, that is, the period of time in which the clay mass assumes a form sufficiently rigid to permit of its handling. It has been found that the rate at which the mix will set up into a form which can be handled depends not only upon the amount of plaster but upon the water content and to a considerable extent upon the percentage of acid used and the type of plaster. Ordinarily the lowest amount of plaster compatible with the formation of cell spaces of the desired size and the desired setting up time is employed, since the higher percentage of lime may cause trouble in firing or heat treating the ware.

The interaction of an acid and a carbonate has been mentioned as a preferred way for generating the gas which causes the "bloating" of the clay mass. This reaction is utilized principally on account of the fact that it is inexpensive, but it should be understood that we do not limit ourselves to this particular action. We have used a wide variety of chemicals which either due to a chemical interaction or to a decomposition upon heating will produce a gas. The only limiting condition is that the action must take place when the clay is still in a fluid state so that the gas may spread the clay to produce the cell spaces and the irregular, enclosing and intervening thin clay wall around the spaces. We are aware of the fact that materials having a certain degree of porosity have been produced heretofore by mixing such materials with an organic or combustible material such as sawdust, which upon being subsequently burned leaves openings or pores in a refractory body. Also it has been proposed to produce a vesicular body through the employment of argillaceous materials which on being subjected to kiln temperatures generate gases to produce a fired clay body of light weight, as disclosed, for example, in the patent to Boynton, 1,582,521, patented May 4, 1926, but the present invention differs from the process described in said patent by the fact that the cellular spaces are developed in the clay mixture while the latter is in a substantially fluid state and while maintained preferably at ordinary temperatures, and also in the further respect that the product produced by our method is characterized by its uniform cellular structure, wherein the cells are of an individually sealed, non-communicating character, of uniform size, and wherein the walls of the cells are free from glass-like crystals or formations which are the result of the evolution of gas by the employment of kiln temperatures. It has also been proposed to produce a light weight porous material by forming a fluid plastic mixture of evenly divided argillaceous material with water, incorporating therein a tenacious foam, shaping and drying this admixture and then finally treating the dried porous mass to maintain a substantially hardened cellular product. In the present invention, however, the peculiar desired cellularity of the product is obtained by the employment of gas producing materials in the fluid plastic mixture which react when unheated and while the mixture is in a fluid state to produce the uniform non-communicating cells, and wherein the setting of the cell walls in the unheated mixture is accelerated by the employment of plaster of Paris or its equivalent, whereby greater uniformity in the cellular structure of the product is obtained together with the substantially complete absence of intercommunication between the cells.

The present invention provides a product which lends itself readily to manufacture in an economical and practical manner and which uses clay as its major constituent. The cellularity of the clay is produced by causing a gas to be generated and entrapped in the plastic clay mass, thus producing when dry a fired and strong material having a multitude of small closed cells evenly distributed throughout the mass. The addition of plaster of Paris, or its equivalent, to the batch while not strictly essential to the success of the product is nevertheless a favorable adjunct in that it enables the control of the operation at will, controls cell area and greatly increases the speed at which the operation can be carried out as well as the variety of shapes which can be easily made.

For convenience in description and to facilitate a clear understanding of the invention, reference is to be had to the accompanying drawing wherein:

Figure 1 is a perspective view of a tile block produced by the employment of materials treated in accordance with the present invention.

Figure 2 is a vertical sectional view on an enlarged scale taken through one of the walls of the block, and Figure 3 is a similar view showing a fragment of the construction disclosed in Figure 2 on a considerably larger scale.

As illustrative of one of the preferred methods of producing the material comprising the present invention, the following example is given: 100 pounds of clay ground to pass a 20 mesh sieve is mixed while dry with 10 pounds of plaster of Paris (10 minute set) and three pounds of dolomite (60 mesh). This batch is fed into a blunger, not shown, containing 65 pounds of 3% solution of sulphuric or hydrochloric acid and blunged until a smooth creamy consistency is obtained, which usually takes from one to two minutes. This creamy slip may then be poured into individual molds or on a casting table where the chemical reaction between the various ingredients continues for some minutes. A sufficient quantity of the slip is poured into the molds so that the latter are a trifle more than level full when the chemical reaction is arrested due to the set produced by the plaster of Paris. When the excess material is struck off the unit is ready to be removed from the mold. The materials during this operation are maintained at ordinary temperatures and prior to the drying and firing of the materials, the whole process usually requiring less than 10 minutes. From this point the process is practically the same as in any similar heavy clay plant operation, except that after the ware is fired it may be sawed, cut or otherwise shaped as desired.

Another typical mix consists in the employment of the following materials: Clay 90 pounds, gypsum 10 pounds, dolomite 5 pounds and water in sufficient quantity to produce a mixture having the characteristics of a liquid together with a small quantity of sulphuric acid. In this mixture the clay, gypsum and dolomite are added as a group to the water and sulphuric acid. An outstanding characteristic of this process resides in the fact that the ordinary mixture partakes of the form of a slip or liquid in that it possesses a cream-like consistency rather than a consistency of mud from which fired clay bodies are usually formed. Due to the liquid-like nature of the mixture, the gases generated by the interaction of the carbonate and the acid are permitted to develop and expand freely throughout the entire mass of the mixture to provide the necessary degree of cellularity. However, the clay and the plaster present in a finely divided form serve as colloids in the mixture to control the surface tension of the walls produced around the gas pockets or bubbles, and while these walls are elastic or freely expansible in response to the gas pressures generated yet there is sufficient mass attraction between the colloids comprising the bubble walls to prevent rupture of said walls and the release of the gases entrapped thereby.

Another feature of fundamental importance in the process resides in the addition of the anhydrous agent which for commercial reasons consists preferably of plaster of Paris or gypsum. These materials augment the finely divided clay particles in providing a colloidal mixture wherein the necessary degree of surface tension is imparted to the bubble walls to allow for the free expansion of the gases but to prevent the rupture in such walls by the gas expansion. When such a hydrophil is not employed it it observed that there is a tendency during the setting of the mixture in the form of a plastic mass to settle and to produce undesirable creases, stresses and formations in the completed body when the latter is subsequently fired. Therefore, we have regulated these conditions and provide a process for commercial operation by the introduction of the plaster of Paris into the original mixture which operates to absorb water rapidly so that the bubble or cell walls will at the time of maximum expansion lose the fluid properties thereof at a rapid rate of speed to partake of the characteristics of a plastic, wherein said walls become of fixed and definite form so that upon the subsequent drying and heat treating of the material the walls will retain the form which they assume when fully expanded by the gas generated in the liquid-like mixture. Thus the hydrophil serves to absorb water from said walls at their point of maximum expansion to create permanency in their form and finally to accelerate the period of setting of the cellular mixture so that it may be quickly subjected without loss of time to the necessary drying and firing operations.

The degree of cellularity or porosity of the material may be controlled by varying the relative proportions of the ingredients governing gas formation, and also the temperature of the liquid mixture is of importance in this respect in that a mixture of higher temperature will produce larger pockets or cells than a corresponding mixture of lower temperature. For this reason it is advisable to employ water at a standard temperature, for example 24° C. By varying this temperature the size of the cells may be varied.

Our product is made of clay primarily. Advantage is taken of the fact that when clay is mixed with water so as to form a thick cream it possesses a viscosity which will permit it readily to entrap gas bubbles. These gas bubbles will attain a size dependent upon the surface tension of the clay cream and will be held in place by the viscosity of the system. In order to increase the viscosity at a time when the proper internal structure has been attained a reaction is set up which will take water from the system. This is done by adding the material which will react with a portion of the water present. Plaster of Paris constitutes such a material due to its reaction to form a high hydrate. Gels, such as silica gel, will perform approximately the same function due to their hydrophilic nature.

If a carbonate such as dolomite be added to the dry clay or to the slip and violently agitated with it the size of the cells and the thickness of the cell walls will depend upon the size of the individual particles and upon the strength of the acid used. If the mass is set by the addition of a hydrophil the cell forming gases will be confined to the point of origin, thus giving a product containing a vast number of fine individually separated cells surrounded by a clay envelope, which structure is considered ideal in heat insulating bodies. Due to the fragility of the individual cell walls, the product can be easily shaped by cutting, sawing or the like and nailed into place when used as a building unit. It is evident that the bulk or specific gravity (pounds per cubic foot) can be controlled at will by regulating the amount of carbonate and strength of acid used and by controlling the viscosity of the slip.

In the accompanying drawing there has been illustrated a clay body of plate or sheet-like formation which has been formed from the materials comprising the present invention. It will be understood that other types of building blocks or shapes may be made, since the material comprising the present invention may be incorporated in any of the fired clay building units now in common use. If desired, one or more of the sides of the block 1 may be provided with a glazed or other coating 2 which may be presented to the interior of a building or room for the double purpose of producing a more effective form of insulation against heat or moisture transmission and at the same time to present an appearance of esthetic value.

Due to the method of producing the block 1 it will be observed that, as shown in Figures 2 and 3, the block presents in cross-section a plurality of substantially uniformly proportioned small openings or cells 3. These cells are substantially individually sealed and do not communicate with one another. Due to the presence of a plurality of sealed or dead air spaces in the material, the transmission of heat from one side of the unit to the other by convection is practically negligible. The spaces or cells are relatively small so that there is little or no circulation of air in the cells under the influences of heat. The transmission of heat by radiation is also minimized over previous forms of hollow tile and other similar heat insulating bodies by reason of the many thin, twisting or tortuous walls which envelop or surround the individual cells and which break up the components of radiant heat energy and scatter or diffuse such heat so that it is difficult for it to penetrate through the long cellular mass or honeycomb structure of the material and, also, the wall structure of the cells correspondingly serve, due to its peculiar formation, in minimizing the transmission of heat by conduction. The porous or cellular structure of the material and the relatively thin walls formed thereby permit the material to be readily cut, sawed or dressed somewhat after the manner of wood and for the same reason adjoining sections of the material may be connected together by nailing or other mechanical fasteners commonly used in uniting wood sections.

Thus the material comprising the present invention possesses, among others, the following attributes: It is a good heat insulator at either low or high temperatures; may be used to advantage as a sound proof partition between adjoining rooms; possesses lightness of weight; comprises a burned clay product which may be cheaply and economically manufactured and made waterproof by the employment of a ceramic glaze or other coating; it is in many respects a substitute for wood as a building material in that it may be nailed, cut, sawed, dressed or otherwise treated; it is highly resistant to spalling, cracking or deterioration of its homogenous structure when under the influence of high temperatures; possesses ample load sustaining strength; saves labor in handling and erection costs; provides for the saving of space in ordinary wall thickness to secure a given degree of fire protection over materials now in general use for this purpose; and may be used in connection with terra cotta and other facing materials for use as an exterior building wall. The invention possesses also many other valuable properties well understood by those skilled in the art.

While the invention has been described in considerable detail, it will be appreciated that various changes and departures may be made therein from the specific disclosures herein given without departing from the spirit of the invention or the scope of the following claims.

What is claimed is:

1. In a process for producing a cellular fired clay product, the step which consists in generating and releasing a gas in a clay slip of fluid consistency by the interaction of an acid and a carbonate added to the slip.

2. In the process of manufacturing a cellular fired clay product, the step which consists in generating within a clay mixture of fluid consistency a gas by the interaction of a dilute acid and carbonates present in the mixture.

3. In the manufacture of a light weight fired clay product, the steps which consist in producing a clay mixture of fluid-like consistency, bloating the mixture by developing a gas therein through chemical interaction of an acid and the carbonates present in the mixture while the latter is in a formative state, and subsequently heat treating the partially dried cellular mass to secure the hardened and permanent cellular product.

4. In the manufacture of a cellular ceramic product, the steps which consist in producing a fluid clay mixture, and then bloating said mixture by the interaction of an acid with carbonates present in the mixture.

5. In the manufacture of a cellular ceramic product, the steps which consist in producing a clay mixture of cream-like consistency and generating and releasing a gas uniformly throughout the entire mass of the mixture by the interaction of an acid and carbonates present in said mixture.

6. In the manufacture of a cellular ceramic product, the steps which consist in forming a fluid plastic mixture consisting of clay-containing carbonates and water, and generating a gas in said mixture by the addition thereto of a dilute acid solution.

7. In a process for manufacturing a cellular ceramic product, the steps which consist in producing a clay-water mixture having a consistency resembling a thick cream, and generating and liberating a gas in said mixture by introducing a dilute acid solution therein for interaction with carbonates present in the mixture.

8. The process of manufacturing a cellular fired clay product characterized by its lightness of weight, which consists in forming a clay-water mixture having a consistency resembling a thick cream, adding to the mixture a dilute acid solution for interaction with the carbonates present in the mixture to generate and release uniformly throughout the entire body of the mixture a cell-forming gas, and in controlling the period of setting of the mass by the addition of a hydrophilic substance.

9. In the manufacture of a cellular fired clay product, the steps which comprise producing a clay and water mixture of fluid consistency containing carbonates and a dilute acid, permitting of chemical interaction between the carbonates and acid to develop a uniformly distributed gas throughout the mixture to produce upon the subsequent hardening of the mixture a plurality of small individual cells distributed uniformly throughout the clay mass, and subsequently heat treating the clay mass to secure permanency in the form thereof.

10. In the manufacture of a cellular ceramic product, the steps which comprise producing a fluid mixture consisting of a carbonate-containing clay, plaster of Paris, water and a small amount of an acid, agitating said mixture until it attains a smooth, creamy consistency, then allowing interaction between the acid and the carbonates present to produce a cell-forming gas throughout the entire body of the mixture, controlling the viscosity of the cell walls by the amount of plaster of Paris present in the ordinary mixture to confine quickly the released gas bubbles to substantially the point of origin, and subsequently heating the cellular clay mass at temperatures sufficient to maintain the desired permanency of the same.

11. The method of producing a cellular clay product, which consists in first producing a clay and water mixture containing an acid and carbonates and wherein the mixture originally possesses a consistency of a heavy fluid, permitting chemical interaction between the acid and the carbonates to generate gas bubbles throughout the mixture and permitting said bubbles to attain the desired size while the mixture is in a fluid state, then increasing the surface tension of the walls of the cells produced by the bubbles through the employment in said mixture of a hydrophilic material, and subsequently subjecting the cellular mass to heat treatment to secure the desired permanency in the form of said mass.

12. The method of producing a cellular clay product which consists in first producing a substantially fluid clay and water mixture containing compounds which react to generate gas bubbles throughout the mixture while the latter is in its substantially fluid state, accelerating the drying and setting of the mixture by the addition thereto of relatively small quantities of gypsum and finally subjecting the material following the development of the cellular structure to kiln temperatures to permanently fix its cellular form.

13. A process for producing a cellular clay material which consists in forming a substantially fluid clay mixture containing interacting gas-producing chemicals which react while the mixture is in its substantially fluid state to produce a cellular structure throughout the mass of said material, in confining the released gas to substantially the points of origin thereof in said mixture by incorporating in the latter a hydrophilic compound to accelerate the preliminary drying and setting of said material and the retention of its desired cellular form, and finally subjecting the material following the development of the cellular form to kiln temperatures sufficiently high to permanently fix the cellularity of the material without vitrification thereof.

14. A process for producing a non-vitrified cellular clay material which consists in forming a substantially fluid clay-water mixture, adding to said mixture interacting gas producing chemicals which function while said mixture is in a substantial fluid state to generate cell-forming gas throughout the entire body of the mixture, controlling the viscosity of the cell walls by the addition to the mixture of a relatively small quantity of gypsum, and finally subjecting the material to elevated temperatures sufficient to permanently fix the desired cellularity of the material but insufficient to effect vitrification of said material.

In testimony whereof we affix our signatures.

TAJAMUL HUSAIN.
GEORGE A. BOLE.